United States Patent [19]

Rips et al.

[11] 4,078,418
[45] Mar. 14, 1978

[54] CALIBRATION INSTRUMENT

[75] Inventors: Irving Rips, Beverly Hills; Kemper H. Vine, Santa Monica, both of Calif.

[73] Assignee: Younger Manufacturing Company, Los Angeles, Calif.

[21] Appl. No.: 781,675

[22] Filed: Mar. 28, 1977

[51] Int. Cl.² .......................... G01B 5/20; G01C 25/00
[52] U.S. Cl. .................................... 73/1 J; 33/174 A; 356/243
[58] Field of Search ..................... 73/1 R, 1 J; 33/168, 33/174 A, 174 H; 356/243

[56] References Cited

U.S. PATENT DOCUMENTS

| | | | |
|---|---|---|---|
| 447,276 | 2/1891 | Brayton | 33/172 |
| 2,862,178 | 11/1958 | Moore | 73/1 J |

*Primary Examiner*—S. Clement Swisher
*Attorney, Agent, or Firm*—James E. Brunton

[57] ABSTRACT

An all-in-one instrument for use in checking and calibrating a multiplicity of different tools and measuring devices of the type commonly employed in the lens manufacturing industry. Due to the design of the device, the single instrument can be used for precisely checking, cross-checking and calibrating numerous devices including lens clocks, lens meters, surfacing laps and calipers.

9 Claims, 3 Drawing Figures

It is a further object of the invention to provide an instrument of the class described which is versatile, compact, rugged, and highly reliable in use.

It is still another object of the invention to provide a novel all-in-one instrument of the character described which can be readily and inexpensively manufactured.

In summary, these and other objects of the invention are realized by a calibration instrument for use in calibrating tools and measuring apparatus of the type employed in lens manufacturing operations comprising a lens holding body, at least one plano surface lens carried by the body, at least one lens carried by the body having a concave surface of known curvature, at least one lens carried by the body having a convex surface of known curvature and means for aligning the body with respect to the apparatus being calibrated.

DESCRIPTION OF ONE FORM OF THE INVENTION

Figure 1:
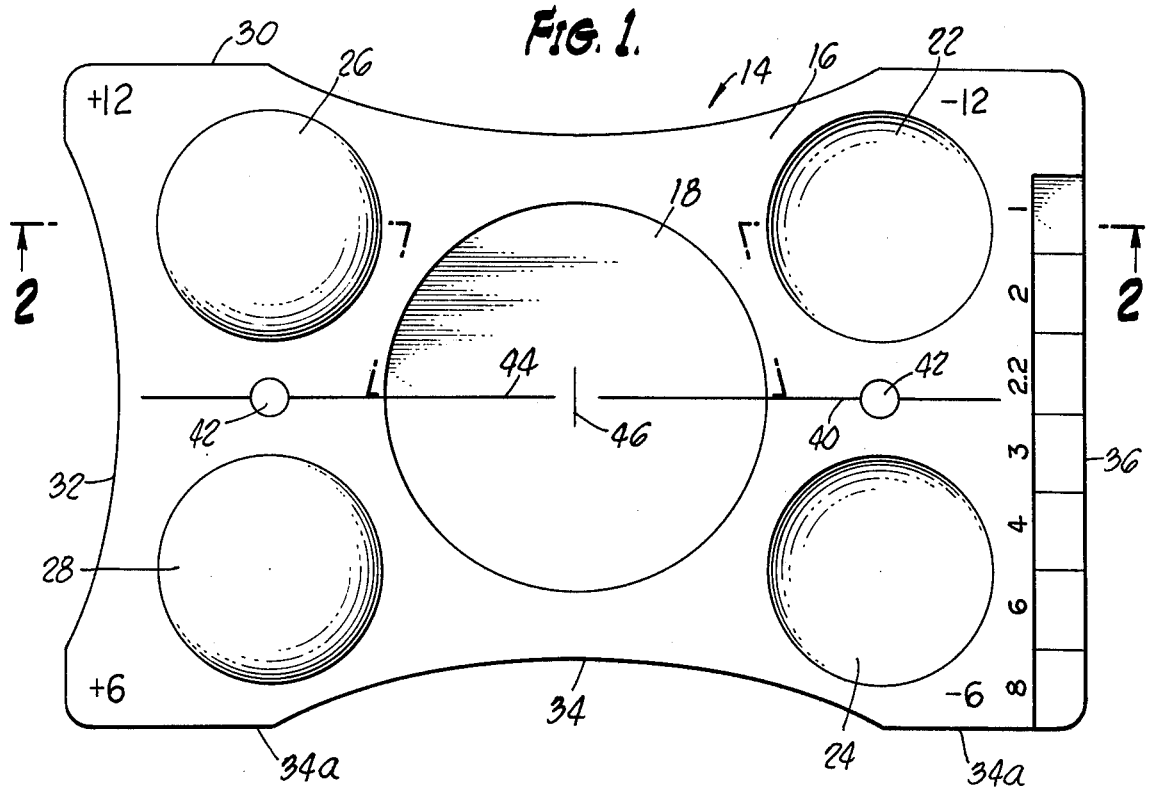
FIG. 1 is a top plan view of the calibration instrument of the invention.
Figure 2:
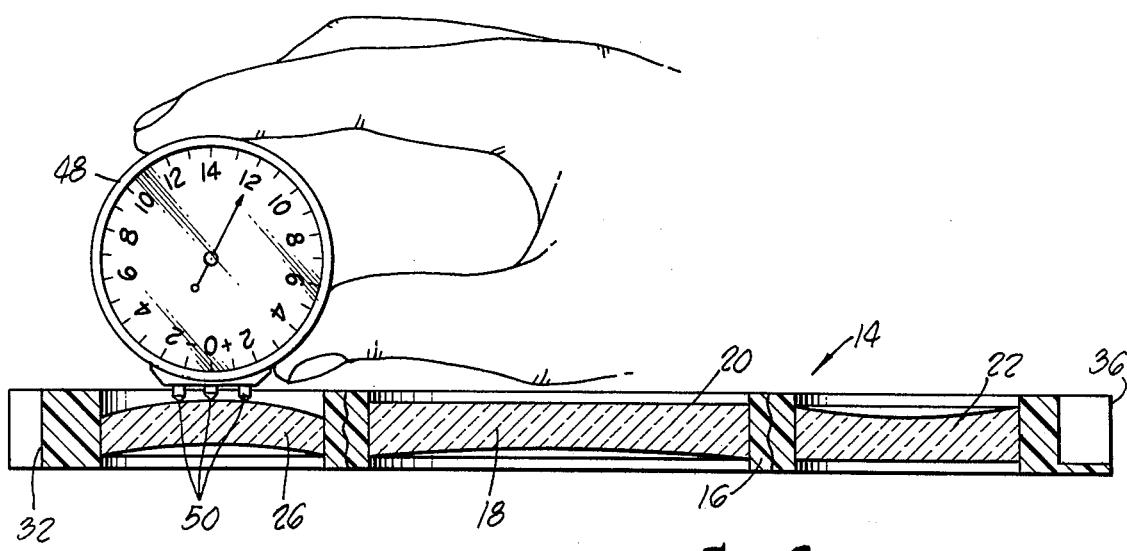
FIG. 2 is a cross sectional view taken along lines 2—2 of FIG. 1. Use of the instrument for checking the calibration of a lens clock is diagramatically illustrated in FIG. 2.

Referring to the drawings and particularly to FIGS. 1 and 2, the calibration instrument of the invention is generally designated by the numeral 14. The instrument, which is particularly designed for use in calibrating tools and measuring apparatus of the type commonly employed in lens manufacturing operations, comprising a lens holding body 16 within which are mounted a plurality of lenses including a lens 18 having an upper plano surface 20 (FIG. 2). Mounted within body 16 about the periphery of centrally disposed lens 18 is a first lens 22 having a concave surface of known curvature, a second lens 24 having a concave surface of a known lesser degree of concave curvature, the third lens 26 having a convex surface of known curvature, and a fourth lens 28 having a convex surface of a known lesser degree of convex curvature. In the form of the invention shown in the drawings, first lens 22 has a curvature of minus 12.00 diopters, second lens 24 has a curvature of minus 6.00 diopters, third lens 26 has a curvature of plus 12.00 diopters, and fourth lens 28 has a curvature of plus 6.00 diopters. This group of lenses, along with lens 18 comprise a master set of precision manufactured lenses.

As best seen in FIG. 2, the lenses are securely mounted within apertures formed in body 16 and are positioned so that the surfaces of the lens are disposed between the planes of the upper and lower surfaces of body 16. This feature precludes damage to the surface of the lens when the instrument is resting on a solid surface such as the top of a workbench or the like.

Body 16 can be constructed from any durable synthetic resin or metal material such as polyethylene, magnesium, or steel. The lenses may be constructed from either glass or plastic, but preferably the former and are all measured to within six fringes for extreme accuracy.

Lens or gauge body 16 is substantially rectangular in shape having first, second, third, and fourth edges 30, 32, 34, and 36 respectively. In the form of the invention illustrated in FIG. 1, edges 30, 32, and 34 are each provided with a precisely curved portion of a known radius. For example, edge 30 is provided with a curved portion precisely curved to a radius of 8.25 diopters. Edge 32 has a curved portion of precisely 4.25 diopters, while edge 34 has a curved portion of precisely 6.25 diopters. These curved edge portions serve as master templates for the most commonly used optical curves and may be conveniently used for periodically checking tools or templates employed in the lens manufacturing operations. It is to be understood that the edges of body 16 can be curved to any desired radius in order to function as master templates for expeditious checking and calibration of working tools and templates.

Figure 3:
FIG. 3 is an end view of the instrument looking at the right end of the instrument as shown in FIG. 1.

Referring to FIGS. 1 and 3, edge 36 is stepped to provide a plurality of contiguous edge segments of varing wall thicknesses. In the form of the invention shown in the drawings and as indicated by the indicia depicted on FIG. 1, the wall thickness of the step portions varies from 1 mm. to 8 mm. with a special 2.2 mm. intermediate checkpoint. Each of the stepped portions is precisely ground to a predetermined thickness and provide ready means for quickly checking and recalibrating thickness gauges, calipers, and the like.

Turning again to FIG. 1, the instrument of this form of the invention also includes alignment means for aligning body 16 with respect to the apparatus being calibrated such as a lens meter. In this embodiment of the invention, the alignment means comprises indicia 40 provided on body 16 indicating the longitudinal center line thereof and a pair of spaced apart precisely centered apertures 42 formed in body 16 along the longitudinal center line thereof. The purpose and method of using the alignment means will presently be described.

Operably correlated with the alignment means of the instrument are indicia 44 and 46 provided on plano surface lens 18. These indicia precisely indicate the vertical and horizontal axis of lens 18 and are located in an exact, known relationship with respect to the alignment means previously identified. As will presently be described, indicia 44 and 46 are used along with the alignment means for the calibration of measuring devices such as lens meters.

Referring to FIG. 2, there is illustrated the manner in which the instrument of the invention may be used for checking lens clocks of the type illustrated in FIG. 2 and generally designated by the numeral 48. The lens clock 48 is provided at one edge with three spaced apart feet 50 adapted to engage the upper surface of the lens being measured. One or more of feet 50 are movable in and out relative to the body of the instrument and in this way sense the curvature of the lens. As indicated in FIG. 2, the face of the lens clock is calibrated in diopters giving positive readings in one direction and negative readings in the opposite direction in response to movement of feet 50.

When the instrument of the invention is used to check the calibration of a lens clock, the clock is first placed on one of the master lenses such as lens 26. As shown in the drawings, lens 26 has a known radius of curvature of plus 12.00 diopters. If the lens clock is functioning properly, it should, when placed on lens 26, give a reading of exactly plus 12 diopters in the manner illustrated in FIG. 2. The lens clock is then moved sequentially to each of the lenses comprising the master set and if properly calibrated should give the reading of the known radius of curvature of each of the master lenses. When the lens clock is placed on the plano surface lens 18, it

CALIBRATION INSTRUMENT

BACKGROUND OF THE INVENTION

1. Field of the Invention

The present invention relates generally to calibration and measuring devices. More particularly, the invention relates to a novel multipurpose instrument for use in checking and calibrating a wide variety of tools and measuring devies of the type commonly used in the lens manufacturing industry.

2. Discussion of the Prior Art

Tools and measuring devices commonly used in the business of lens manufacturing include lens clocks, lens meters, calipers, surfacing laps, and lens marking devices.

The lens clock is an instrument for determining the degree of curvature of a lens. It is usually a handheld device having somewhat the appearance of a clock or watch. Typically, the instrument is provided at one edge with three spaced apart feet which impinge the surface of the lens. These feet are movable in and out relative to the body of the instrument and sense the curvature of the lens. The face of the instrument is calibrated in diopters usually giving positive readings in a clockwise direction and negative readings in a counterclockwise direction in response to relative movement of the lens engaging feet.

Lens clocks are typically fragile and quite susceptible to damage if dropped or jarred. Prior to use, therefore, they must be routinely checked against a master standard. In the past, the standards used generally consisted of individual lens of supposedly known curvature. In practice these "standards" frequently consisted of ordinary lenses of standard manufacture and their curvature was taken to be that specified by the manufacturer of the lenses. This practice often led to gross inaccuracies in calibration. For example, depending upon the particular manufacturer and his particular manner of compensating to accommodate for error in the index of retraction of glass, a lens slated to be plus 8.00 diopters could well be plus 8.13 or even 8.25 diopters. Even when true individual master lenses were used by the lens maker, however, calibration errors were frequent because of damage to the master lens due to mishandling and wear.

These drawbacks of prior art practice in checking and calibrating lens clocks are effectively avoided through use of the instrument of the present invention. Each lens of the device of the present invention is precisely manufactured to exactly the stated curvature. Additionally, each lens is securely mounted with a sturdy gauge body to preclude damage. Further, the instrument embodies within the single gauge body a complete master lens set including lenses of plus 6.00 diopters, plus 12.00 diopters, minus 6.00 dopters, −12.00 diopters and a plano surface. This enables expeditious check and cross-check of the lens clock against each of the lenses of known, varying curvature, thereby virtually eliminating the possibility of calibration error.

The lens meter is an instrument designed for the measurement of the optical characteristics of spectacle lenses. Although commercially available lens meters vary somewhat in design, they typically embody a lens table or lens positioning ruler for supporting the lens and means for adjusting the table so as to center the lens within the instrument. Generally the lens meter also includes lens marking means for marking the center of the lens. Typically, the marking means comprises three spaced apart marker nibs movable into engagement with the specimen lens. One of these marker nibs generally indicates the center and the other two a particular axis or direction.

It is extremely important to periodically check the lens meter to make certain that the table is properly aligned and to calibrate the centering and vertical and horizontal axis indicators of the instrument. Additionally, periodic checks must be made of the lens marking means of the device to verify that accurate markings are being made on the specimen lenses.

In a manner presently to be described in greater detail, the unique design of the instrument of the present invention enables complete checking and calibration of all aspects of the lens meter apparatus. The alignment means of the instrument permits quick checking of the alignment of the lens meter lens table and the operably correlated indicia marking provided on the plano surface of the device enables expeditious checking and calibration of the vertical and horizontal axis indicators of the apparatus. The indicia marking on the plano surface also provide means for quickly and positively determining the accuracy of the lens marking means of the apparatus. Finally, the master lenses of the instrument provide ready means for precisely checking the diopter (powder) readings of the lens meter.

In addition, as will become apparent from the detailed description of the invention which follows, the instrument of the invention provides built-in easy-to-use means for readily checking and calibrating standard base curve gauges, thickness gauges, and calipers.

SUMMARY OF THE INVENTION

It is an object of the present invention to provide a novel all-in-one instrument for use in checking and calibrating tools and measuring devices of the type commonly used in the lens manufacturing industry in which, due to the unique design of the device, a multiplicity of tools and measuring devices can accurately be checked and calibrated using only the instrument of the invention.

It is another object of the invention to provide an instrument of the aforementioned character in which there is embodied within the device, in a predetermined relationship, a set of master lenses of known configuration to enable the complete and precise checking and calibration of lens clocks.

It is another object of the invention to provide a device of the character described in which the master lenses are arranged within the device in a predetermined relationship with respect to reference lines scribed upon the body of the device and upon at least one of the lenses to enable precise alignment and calibration of lens meters of various designs and manufacture.

It is still another object of the invention to provide an instrument of the type described in the preceding paragraphs in which the body of the instrument is precisely configured to provide at the margins thereof master templates for the most used curves to enable expeditious chiecking of tools or templates.

It is another object of the invention to provide a precision all-in-one instrument of the character described in the previous paragraphs in which one margin of the body is configured to enable quick and precise calibration of calipers.

should, of course, reflect a "0" reading. If the lens clock fails to indicate the proper radius of curvature of each of the lenses of the instrument of the invention, it should not be used in manufacturing operations, but rather should be recalibrated. Recalibration may be accomplished using the instrument of the invention and adjusting the mechanism of the lens clock so that it correctly reflects the radius of curvature of each of the master lenses embodied within gauge body 16.

Calibration of a lens meter using the instrument of the present invention is accomplished as follows:

Step 1 involves a check of the alignment of the lens table or stage which is used in supporting and centering the specimen spectacle lens within the lens meter. To accomplish this check, the instrument is placed on the lens table so that the flat portions 34a of edge 34 of body 16 rest upon the lens table. The operator then sights through apertures 42 provided in body 16. If the lens table of the lens meter is in proper alignment, the center line indicia inscribed on the lensometer itself should fall into precise alignment with indicia 40 provided on body 16. If the lens table is out of alignment it can be adjusted into a position wherein the centering indicia on the lens meter body, as viewed through the spaced apart apertures 42, correctly falls into direct alignment with indicia 40 provided on body 16.

As a second step in calibrating the lens meter, the instrument of the invention is positioned on the lens meter so that the crossover point of indicia 44 and 46 provided on lens 18 is precisely centered within the lens meter apparatus. If the lens meter is correctly calibrated, the horizontal and vertical meridians of the lens meter, as viewed through the lens meter optics, should precisely parallel indicia 44 and 46 provided on lens 18. If such is not the case the lens meter can be calibrated so that its horizontal and vertical axis indicators thereof correctly parallel the indicia 44 and 46 provided on lens 18.

With the instrument of the invention precisely centered within the lens meter, the next step in calibrating the apparatus involves a check of the lens marker of the lens meter. This is accomplished by bringing the lens marker into engagement with lens 18 so that marks are actually made on the upper plano surface thereof. If the lens meter marker is functioning properly, the marker into dots should fall precisely at the intersection of indicia 44 and 46 and along indicia 44 provided on lens 18. If such is not the case, the lens meter lens marking apparatus must be adjusted.

As a final step in the calibration of the lens meter apparatus, each of the master lenses of the instrument is centered within the apparatus and diopter readings taken. If the lens meter is functioning properly, the diopter readings should precisely correspond to the known diopters of the master lenses of the instrument. If the apparatus gives erroneous power readings it must be recalibrated.

In the manner thus described, the instrument of the invention functions to completely check and calibrate the lens meter without the need for auxiliary gauges and equipment. The unique arrangement of the alignment means and master lenses of the instrument for the first time enables a single instrument to be used for the complete and precise checking and calibration of the lensometer apparatus.

Having now described the invention in detail in accordance with the requirements of the patent statutes, those skilled in this art will have no difficulty in making changes and modifications in the individual parts or their relative assembly in order to meet specific requirements or conditions. Such changes and modifications may be made without departing from the scope and spirit of the invention, as set forth in the following claims.

We claim:

1. A calibration instrument for use in calibrating tools and measuring apparatus of the type employed in lens manufacturing operations, comprising:
   a. a lens holding body;
   b. at least one plano surfaced lens carried by said body;
   c. at least one lens carried by said body having a concave surface of known curvature;
   d. at least one lens carried by said body having a convex surface of known curvature;
   e. alignment means for aligning said body with respect to the apparatus being calibrated.

2. A calibration instrument as defined in claim 1 in which said plano surfaced lens is centrally disposed relative to said body and in which said device includes two lenses having convex surfaces of known curvature, said lenses being disposed within said body in a predetermined orientation relative to said alignment means.

3. A calibration instrument as defined in claim 2 in which said lenses having concave surfaces have curvatures of minus 6.00 diopters and minus 12.00 diopters respectively and in which said lenses having convex surfaces have curvatures of plus 6.00 diopters and plus 12.00 diopters respectively, said lenses being disposed about the periphery of said lens having a plano surface.

4. A calibration instrument as defined in claim 1 in which said plano surfaced lens is provided with indicia precisely indicating the vertical and horizontal axis thereof, said indicia being located in a known relationship with respect to said alignment means.

5. A calibration instrument as defined in claim 1 in which said alignment means comprises indicia provided on said lens holding body indicating the longitudinal center line thereof and a pair of spaced apart apertures formed in said body on the longitudinal center line thereof.

6. A calibration instrument as defined in claim 1 in which said gauge body has first, second, third, and fourth edges, said first edge being formed to define a plurality of contiguous segments of varying wall thickness.

7. A calibration instrument as defined in claim 5 in which at least one of said second, third, or fourth edges is precisely curved to a known radius.

8. A calibration instrument for use in calibrating tools and measuring apparatus of the type employed in lens manufacturing operations, comprising:
   a. a substantially rectangular lens holding body having first, second, third, and fourth interconnected side walls, one of which is formed to define a plurality of contiguous segments of varying wall thickness;
   b. at least one plano surfaced lens carried by said body said lens having indicia thereupon precisely indicating the vertical and horizontal axis of said lens;
   c. a pair of lenses carried by said body having concave surfaces of known curvature;
   d. a pair of lenses carried by said body having convex surfaces of known curvature; and e. alignment means comprising indicia upon said lens holding body indicating the longitudinal center line thereof and a pair of spaced apart apertures formed in said body on the longitudinal center line thereof said alignment means being operably correlated with said indicia provided on said plano surfaced lens.

9. A calibration instrument as defined in claim 8 in which three of said side walls are curved to a known radius.

* * * * *